July 13, 1954 A. D. V. RIDLINGTON 2,683,771

COMMUNICATION SWITCHING SYSTEM

Filed Nov. 9, 1951 2 Sheets-Sheet 1

Inventor,
Anthony D. V. Ridlington,
by Hall + Houghton
Attorneys.

July 13, 1954 A. D. V. RIDLINGTON 2,683,771

COMMUNICATION SWITCHING SYSTEM

Filed Nov. 9, 1951 2 Sheets-Sheet 2

INVENTOR

Anthony D.V. Ridlington,

BY Hall & Houghton

ATTORNEY

Patented July 13, 1954 2,683,771

UNITED STATES PATENT OFFICE 2,683,771

COMMUNICATION SWITCHING SYSTEM

Anthony Douglas Vaughan Ridlington, Bromley, England

Application November 9, 1951, Serial No. 255,588

Claims priority, application Great Britain November 15, 1950

18 Claims. (Cl. 179—15)

Figure 1:
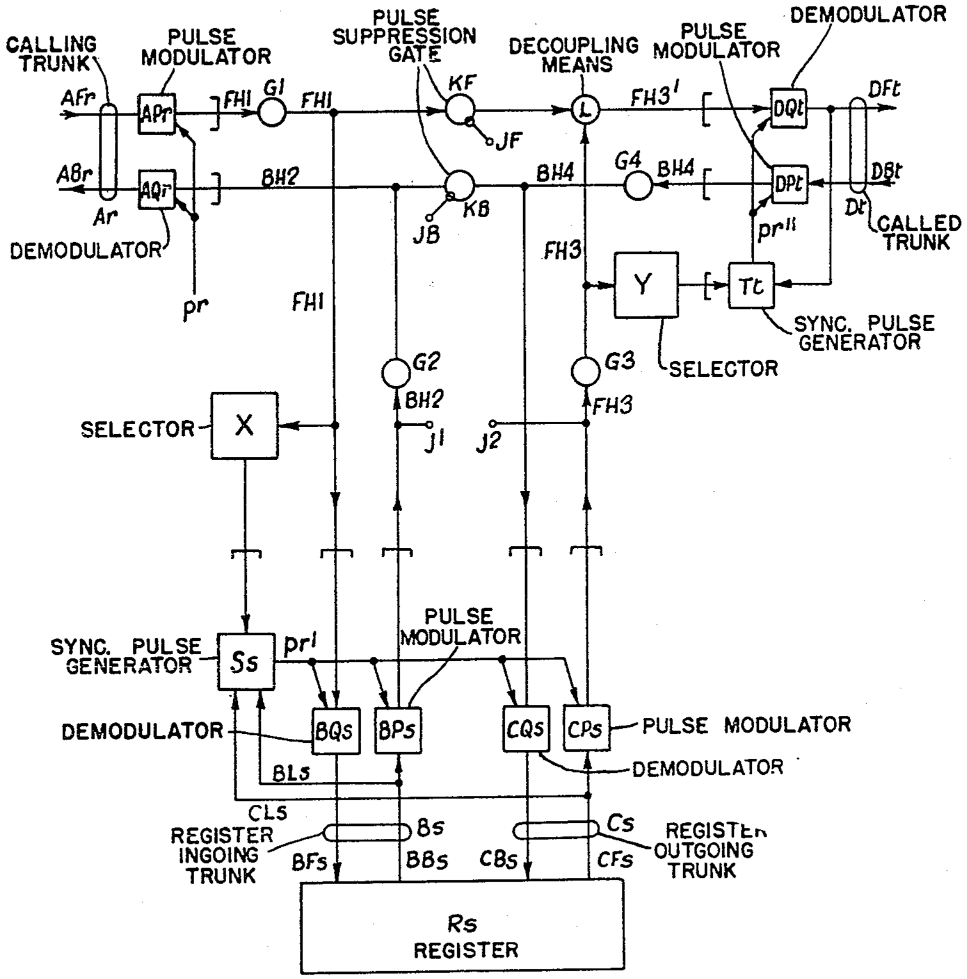

This invention relates to communication switching systems using time division multiplex switches and has particular, although not exclusive reference to switching in automatic telephone exchanges using time division multiplex switches, and will be described in relation to such exchanges.

In the operation of an exchange any one of a number of calling subscriber's lines, junctions or other lines external to the exchange, hereafter called calling circuits, may require to be connected to any one of a number of called subscriber's lines, junctions or other lines external to the exchange, hereafter called calling circuits, and many such connections, hereafter called through connections, may be required to be set up and to be maintained simultaneously. During the setting-up of such through connections it is common practice for a calling circuit to be first connected to a register over a path which includes a bridge circuit. When such connection has been made information is sent from the calling circuit to the register which enables the register to identify one or more called circuits over any one of which the desired through connection may be advanced or completed. The register then connects itself via the bridge circuit to one of the called circuits and sends to, or over, that called circuit and receives from it any information necessary for the advancement or completion of the through connection. For example, the register may send information over the called circuit to another register in another exchange, or the register may send a testing signal to the called circuit and receive from the called circuit a check signal indicating that the circuit is in order. When the register is ready to release itself from the calling and called circuits it must first connect the calling circuit to the called circuit within the bridge circuit and then release itself from the calling circuit and called circuit.

The present invention has for its main object the provision in communication systems using time division multiplex switches of alternative arrangements to have the same effect as the bridge circuit heretofore employed in single channel systems but being simpler and cheaper to provide, in communication systems using time division multiplex switches. The invention is not restricted in its application to the connection of calling and called circuits to a register, but for convenience it will be assumed in the description given below that it is to be used for such a purpose.

Provision is made for connecting a calling circuit to a register and connecting the register to the required called line, both connections being made via the same time division multiplex switch, and for making, under the control of the register, direct connection in the switch between the calling and the called circuits. The calling circuits, called circuits and registers will normally be connected to such switches via trunks and other switches within the exchange, a trunk being a connecting link between two switches within an exchange. Those trunks terminating on such switches over which calling circuits, called circuits and registers may be connected to such switches are hereafter called respectively calling trunks, called trunks and register trunks.

In the following description the invention will be set forth in its application to trunks each with two transmission paths one in each direction along the trunk, but it will be apparent to those skilled in the art that the invention also has application to trunks each with more than two transmission paths or to trunks each with only one transmission path. Referring to trunks each with two transmission paths as described, the forward transmission path is that over which information is transmitted from the calling trunk to the register or from the register to the called trunk or from the calling trunk to the called trunk, and the backward transmission path is that over which information is transmitted in the opposite direction.

In this specification, by "a pulse" is meant a brief change of current or voltage in a circuit and by "a pulse train" is meant a succession of pulses occurring at regular intervals. Two pulse trains are said to be synchronous when the pulses of one of the pulse trains are synchronous with those of the other pulse train.

According to the present invention a communication switching system includes a time division multiplex switch, a calling trunk and a called trunk, a register through which the calling trunk is connected to the called trunk and a circuit through which communication between the calling and called trunks is maintained after the register has been released, the connection between the called trunk and the register is effected by the use of a pulse train synchronous with a pulse train used to effect connection between the calling trunk and the register and common signal paths used for both connections are connected together through pulse suppression gates to which a suppressing pulse train or pulse trains is or are applied in order to prevent direct communication between calling and called trunks until such communication is required.

In certain forms of communication switching system according to the invention, instead of a register, there may be used a further trunk connected to equipment to which the calling trunk is to be temporarily connected and the connection between the called trunk and said further trunk is effected by the use of a pulse train synchronous with a pulse train used to effect communication between the calling trunk and a still further trunk connected to equipment to which the calling trunk is to be temporarily connected.

In one form of time division multiplex switch according to the invention each transmission path of a plurality of transmission paths which transmit signals to the switch is connected to the input terminals of a separate pulse modulator and the output terminals of each such modulator are connected to a common signal circuit. Each pulse modulator is fed with a pulse train which is modulated at the modulator by signals appearing on the transmission path connected to the input of the modulator, and the pulse train so modulated appears on the common signal circuit: the pulse train may be modulated in amplitude, position or width. The pulse trains fed to the various pulse modulators are time spaced so that the pulses of any one pulse train are not coincident in time with the pulses of any of the other pulse trains.

In a similar manner each transmission path of a plurality of transmission paths which receive signals from the switch is connected to the output terminals of a separate pulse demodulator and the input terminals of each such demodulator are connected to a common signal circuit. Each pulse demodulator is fed with a first pulse train and if there appears on the common signal circuit a modulated second pulse train synchronous with the first pulse train, then the second pulse train is demodulated at the pulse demodulator to which the first pulse train is fed, and the output of the demodulator, consisting of those signals with which the second pulse train on the common signal circuit is modulated, appears on the transmission path connected to the gate.

In a communication system embodying the invention the forward transmission paths of a plurality of calling trunks may each be connected via a separate pulse modulator to a first common signal circuit, and in such a case the backward transmission paths of the calling trunks are each connected via a separate pulse demodulator to a second common signal circuit. The forward transmission paths of a plurality of register trunks, hereafter called register ingoing trunks, are each connected via a separate pulse demodulator to the first common signal circuit, and the backward transmission paths of the register ingoing trunks are each connected via a separate pulse modulator to the second common signal circuit. The other end of each register ingoing trunk has access to a register.

With each of the calling trunks is associated a different time-spaced pulse train which is fed to the pulse modulator and pulse demodulator connected as described to the trunk. With each of the register ingoing trunks is associated a selector. When a calling signal appears on the forward transmission path of one of the calling trunks, such a calling signal indicating that the calling trunk requires to be connected to a register, one of the selectors associated with the register ingoing trunks that is not already generating a pulse train is set to generate a pulse train synchronous with the pulse train associated with the calling trunk on the forward transmission path of which the calling signal has appeared.

A selector may comprise a mercury delay line circuit such as those described on pp. 103 et seq. of "Proceedings of Symposium on large scale digital calculating machinery," Harvard University Press, Cambridge, Mass. The line is arranged to have a delay equal to the time between successive pulses of a pulse train. A trigger circuit has connected to its "operate" lead a lead on which calling pulse trains may appear and when such a train or trains of pulses appear the trigger circuit operates to one of the pulses, allows transmission through a gate circuit of that pulse and thereafter prevents transmission through the gate circuit. The pulse which passes through the gate circuit is applied to the delay line which will then generate a train of pulse synchronous with the train of which the transmitted pulse formed a part, and will continue to do so after the removal of the original train from the "operate" lead of the trigger circuit. Thus it will be understood that while selectors of the master and slave type are referred to hereinafter, requiring the presence of the masters X and Y and slaves Ss and Tt, the invention is not limited thereto and may be practiced by equipment utilizing selectors of the mercury delay line type.

The pulse train generated by a selector associated with a register ingoing trunk is fed to the pulse modulator and to the pulse demodulator connected as described to the backward and forward transmission paths of the register ingoing trunk. In the manner described a calling trunk may obtain connection to a register, in the forward direction via the first common signal circuit and in the backward direction via the second common signal circuit.

Associated with each register ingoing trunk is a register outgoing trunk. The forward transmission path of each register outgoing trunk is connected via a separate pulse modulator to a third common signal circuit, and the backward transmission path of each register outgoing trunk is connected via a separate pulse demodulator to a fourth common signal circuit. The pulse train generated by a selector associated with a register ingoing trunk is fed to the pulse modulator and pulse demodulator connected as described to the forward and backward transmission paths of the register outgoing trunk associated with the register ingoing trunk.

The forward transmission paths of a plurality of called trunks are each connected via a separate pulse demodulator to the third common signal circuit, and the backward transmission paths of the called trunks are each connected via a separate pulse modulator to the fourth common signal circuit. With each called trunk is associated a selector.

When a register, already connected to a calling trunk as described, is ready to make connection with any one of a number of called trunks over which the desired through connection may be advanced or completed, the register in combination with common equipment causes a marking signal to be applied to the selector associated with one such called trunk. At the same time as the marking signal is applied to the selector, the register emits a connect signal on to the forward transmission path of the register outgoing trunk to which the register is connected. This connect signal causes the marked selector to be set to generate a pulse train synchronous with that generated by the selector associated with the register ingoing and outgoing trunks. The selector associated with the register ingoing and outgoing trunks has already been set as described to generate a pulse train synchronous with the pulse train associated with the calling trunk that is connected to the register. The pulse train generated by the marked selector is fed to the pulse demodulator and pulse modulator connected as described to the forward and backward transmission paths of the called trunk with which the marked selector is associated.

In the manner described a register may obtain connection to a called trunk, signals being transmitted in the forward direction via the third common signal circut and in the backward direction via the fourth common signal circuit.

In carrying out the invention, the first common signal circuit is connected to the first input of a first pulse suppression gate circuit whose output is connected to the third common signal circuit, and the fourth common signal circuit is connected to the first input of a second pulse suppression gate circuit whose output is connected to the second common signal circuit.

A pulse suppression gate circuit operates in a well-known manner to transmit to its output pulses which appear at its first input except at such times as suppressing pulses are applied to its second input, transmission through the pulse suppression gate circuit being prevented for the duration of such suppressing pulses.

In carrying out the invention, means are provided to enable the pulse train generated by any selector associated with a register ingoing trunk or a pulse train synchronous with it to be applied to the second inputs of the first and second pulse suppression gate circuits, the application of the pulse train to the gate circuits being controlled by the register connected to the register ingoing trunk with which the selector is associated. Considering a register connected as described to a calling trunk and a called trunk, it will be understood that the pulse trains concerned with the transmission of signals between the calling trunk and the register on the first and second common signal circuits are synchronous with the pulse trains concerned with the transmission of signals between the register and the called trunk on the third and fourth common signal circuits, and all these pulse trains are synchronous with the pulse train generated by the selector associated with the register ingoing trunk connected to the register. Thus direct communication between the calling trunk and the called trunk will take place in the forward direction via the first common signal circuit, the first pulse suppression gate circuit and the third common signal circuit, and in the backward direction via the fourth common signal circuit, the second pulse gate circuit and the second common signal circuit, except when the pulse train generated by the said selector or another pulse train synchronous with it is applied to the second inputs of the two pulse suppression gate circuits. The register may cause such a pulse train to be applied to the pulse suppression gate circuits during the setting up of the through connection, so that the register can communicate independently with the calling trunk and the called trunk, and when the register is ready to be released it may stop the application of the pulse train to the pulse suppression gate circuits so that the called and calling trunks are connected together as described, and the register can in a well-known manner release the selector associated with the register ingoing and register outgoing trunks to which the register is connected.

Figure 2:
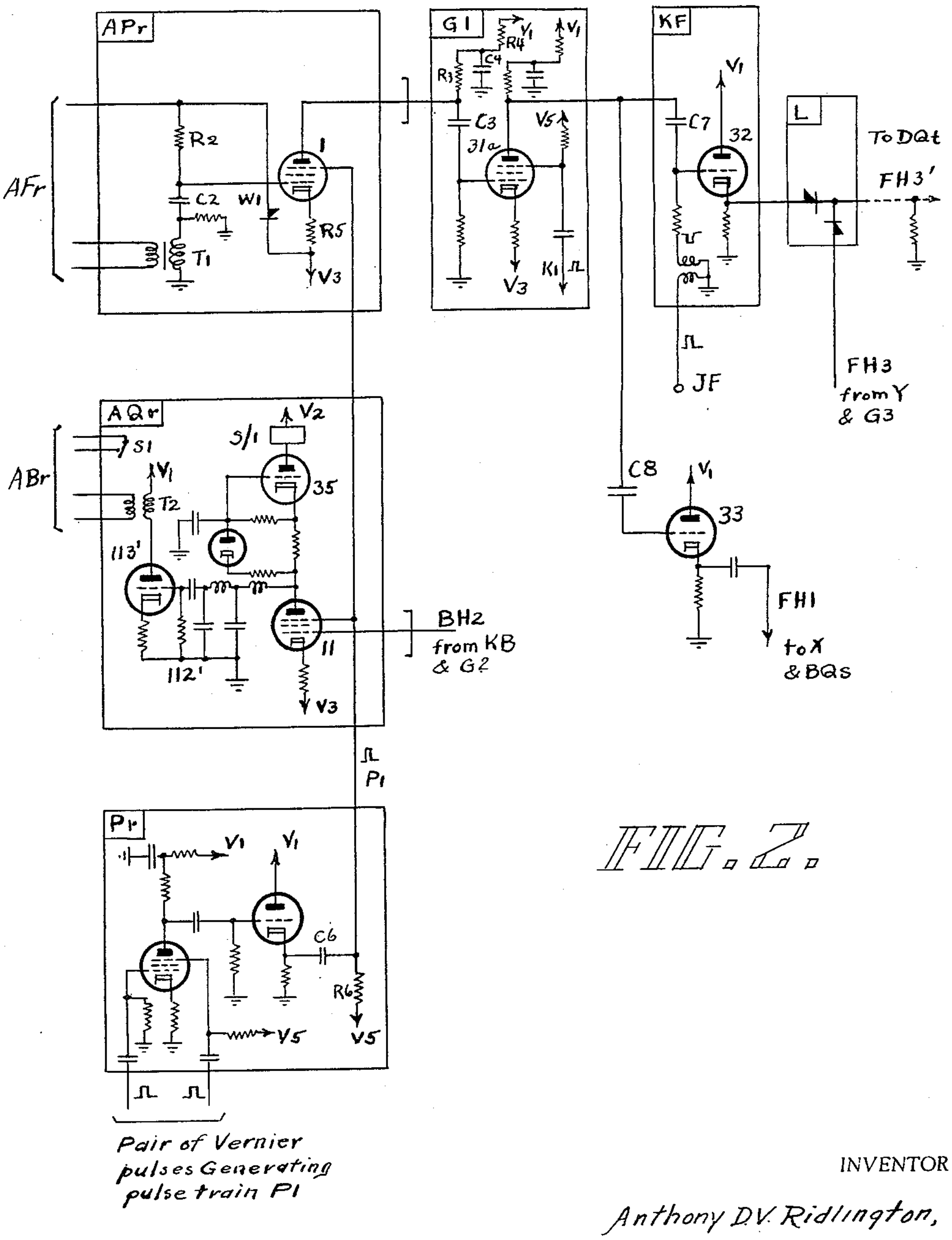

By way of example a particular method of carrying out the invention in a time division multiplex communication switching system using amplitude modulated pulses will be described with reference to the accompanying drawings in which Fig. 1 is a block diagram, with arrow-heads showing directions of transmission, Fig. 2 is a schematic diagram of exemplary components thereof.

In the system to be described each transmission path of each trunk can transmit in addition to speech signals a continuous hold signal which may be an electric potential continuously applied. The hold signals on forward and backward transmission paths are called respectively forward and backward hold. The pulse modulators associated with transmission paths are so designed that pulses appear at the output of a pulse modulator only when a hold signal is present on the associated transmission path.

Referring to the accompanying drawing, A*fr* and AB*r* represent respectively the forward and backward transmission paths of the calling trunk A*r* representing any one of a number of calling trunks which may be designated A1, A2 . . . A*u*. Each forward transmission path AF*r* is connected to the input of a pulse modulator AP*r* which is fed with a pulse train *pr*, the lead applying such pulse train being, for convenience, designated *pr*. Each backward transmission path AB*r* is connected to the output of a pulse demodulator AQ*r* which is fed with the same pulse train *pr*. The pulse trains associated with the various calling trunks corresponding with trunk AR will be referred to as the *u* pulse trains *p*1, *p*2 . . . *pu* and are time spaced. The outputs of the *u* pulse modulators which, for convenience will be identified as AP1, AP2 . . . AP*u* are connected to a first common signal circuit FH1 and the inputs of the *u* pulse demodulators, which for convenience will be identified as AQ1, AQ2 . . . AQ*u* are connected to a second common signal circuit BH2. Pulses on the common signal circuit FH1 are reduced in duration on passing through a pulse shaping gate circuit G1 where they are gated with shorter pulses timed to occur in the middle of the pulses fed to the pulse modulators AP1, AP2 . . . AP*u* and to the pulse demodulators AQ1, AQ2 . . . AQ*u*. In a similar manner pulses on common signal circuits BH2, FH3 and BH4 are reduced in duration on passing through the respective pulse shaping gate circuits G2, G3 and G4 where they are gated with shorter pulses synchronous with the shorter pulses used in the pulse shaping gate circuit G1.

The first common signal circuit FH1 is connected to the first input of a pulse suppression gate circuit KF as shown and the second common signal circuit BH2 is connected to the output of a pulse suppression gate circuit KB.

BF*s* and BB*s* represent respectively the forward and backward transmission paths of an ingoing trunk B*s* to a register R*s* the trunk B*s* representing any one of a number *v* of register ingoing trunks B1, B2 . . . B*v*. Each forward transmission path BF*s* is connected at one end to the output of a pulse demodulator BQ*s* and each backward transmission path BB*s* is connected at the same end to the input of a pulse modulator BP*s*. The inputs of the *v* pulse demodulators which for convenience will be designated BQ1, BQ2 . . . BQ$v$ are connected to the first common signal circuit FH1 and the output of the $v$ pulse modulators which for convenience will be designated BP1, BP2 . . . BP$v$ are connected to the second common signal circuit BH2. The other ends of the forward and backward transmission paths BF$s$ and BB$s$ of the register ingoing trunk B$s$ are connected to the register R$s$.

The first common signal circuit FH1 is connected to the input of a selector control circuit X. Associated with each register ingoing trunk B$s$ is a selector S$s$ and all the corresponding $v$ selectors which will be designated S1, S2 . . . S$v$ are controlled by the selector control circuit X.

When the calling trunk A$r$ requires to be connected to a register, forward hold is passed over the calling trunk and the appearance of forward hold at the pulse modulator AP$r$ causes the pulse train $pr$ to appear on the first common signal circuit FH1. The appearance of the pulse train $pr$ at the input of the selector control circuit X indicates that the calling trunk A$r$ requires connection to a register, and the selector control circuit X sets one of the selectors S$s$ which is not already generating a pulse train to generate a pulse train which will be referred to as $pr^1$ synchronous with the pulse train $pr$ and to feed the pulse train $pr^1$ to the pulse modulator BP$s$ and to the pulse demodulator BQ$s$. Since the pulse trains $pr$ and $pr^1$ are synchronous, signals appearing on the forward transmission path AF$r$ of the calling trunk A$r$ will be transmitted to the forward transmission path BF$s$ of the register ingoing trunk B$s$ and thence to the register R$s$. The register causes backward hold to be applied to the backward transmission path BB$s$ of the register ingoing trunk B$s$ so that a pulse train synchronous with $pr^1$ appears on the second common signal circuit BH2. Signals can then be transmitted from the register R$s$ to the backward transmission path AB$r$ of the calling trunk A$r$ via the backward transmission path BB$s$ of the register ingoing trunk B$s$ and via the second common signal circuit BH2.

The selector S$s$ is so designed that it will continue for a short time after being set to generate the pulse train that it has been set by the selector control circuit X to generate, but after this time has expired there must be at least one hold signal applied continuously to it in order to maintain it in generation, and if there is no such hold signal applied, or as soon as all such hold signals are withdrawn, the selector will cease to generate a pulse train and will be free to be set again by the selector control circuit to generate any of the pulse trains used in the switch. Hold signals present on the backward transmission path BB$s$ of the register ingoing trunk B$s$ and on the forward transmission path CF$s$ of the register outgoing trunk C$s$ are applied via the respective paths BL$s$ and CL$s$ to the selector S$s$, so that the backward hold originated by the register R$s$ as described, will maintain the selector S$s$ in generation provided that this hold appears soon enough after the setting of the selector S$s$.

Means whereby the selector control circuit X and the $v$ selectors S1, S2 . . . S$v$ may operate in the manner described are disclosed in patent application Serial No. 224,874 filed May 7th, 1951.

Associated with each register ingoing trunk B$s$ is a register outgoing trunk C$s$. CF$s$ and CB$s$ represent respectively the forward and backward transmission paths of the register outgoing trunk C$s$ as already indicated and each forward transmission path CF$s$ is connected to the input of a pulse modulator CP$s$ and each backward transmission path CB$s$ is connected to the output of a pulse demodulator CQ$s$. The output of the $v$ pulse modulators which will be designated CP1, CP2 . . . CP$v$ are connected to the third common signal circuit FH3 and the inputs of the $v$ pulse demodulators which will be designated CQ1, CQ2 . . . CQ$v$ are connected to the fourth common signal circuit BH4. The pulse train generated by the selector S$s$ is fed to the pulse modulator CP$s$ and to the pulse demodulator CQ$s$ in addition to being fed to the pulse demodulator BP$s$ and to the pulse modulator BQ$s$ as already described.

DF$t$ and DB$t$ represent respectively the forward and backward transmission paths of a called trunk D$t$ representing any one of a number $w$ of called trunks which will be designated D1, D2 . . . D$w$. Each forward transmission path DF$t$ is connected to the output of a pulse demodulator DQ$t$ and each backward transmission path DB$t$ is connected to the input of a pulse modulator DP$t$. The inputs of the $w$ pulse demodulators, which will be designated DQ1, DQ2 . . . DQ$w$ are connected to a common signal circuit $FH3^1$ and the outputs of the $w$ pulse modulators which will be designated DP1, DP2 . . . DP$w$ are connected to the fourth common signal circuit BH4. The common signal circuit $FH3^1$ is connected to the output of a decoupling circuit L which has two inputs, one connected to the third common signal circuit FH3 and the other connected to the output of the pulse suppression gate circuit KF. The decoupling circuit L permits pulses appearing at either of its inputs to be transmitted unchanged to its output but prevents pulses appearing at either one of its inputs from being transmitted to the other input. The fourth common signal circuit BH4 is connected as shown to the first input of the pulse suppression gate circuit KB.

The third common signal circuit FH3 is connected to the input of a selector control circuit Y. Associated with each called trunk D$t$ is a selector T$t$ and all the $w$ selectors which will be designated T1, T2 . . . T$w$ are controlled by the selector control circuit Y.

When sufficient information has been received by the register R$s$ from the calling trunk A$r$ for one or more called trunks to be identified over any one of which the desired through connection may be advanced or completed, the register R$s$ in combination with common equipment, causes a marking signal to be applied to the selector associated with one such called trunk, for example the selector T$t$ associated with the called trunk D$t$. At the same time as the marking signal is applied to the selector T$t$, the register causes forward hold to be applied to the forward transmission path CF$s$ of the register outgoing trunk C$s$. The appearance of forward hold causes the pulse train $pr^1$ generated by the selector S$s$ to appear on the third common signal circuit FH3 and hence to appear at the input of the selector control circuit Y. The selector control circuit Y then sets the marked selector T$t$ to generate a pulse train $pr^{11}$ synchronous with the pulse train $pr^1$ and with the pulse train $pr$. The pulse train $pr^{11}$ generated by the selector T$t$ is fed to the pulse modulator DP$t$ and to the pulse demodulator DQ$t$.

Since the pulse trains $pr^1$ and $pr^{11}$ are synchronous the register R$s$ can transmit signals to the forward transmission path DF$t$ of the called trunk D$t$ via the forward transmission path CF$s$ of the register outgoing trunk Cs, the third common signal circuit FH3 and the common signal circuit $FH3^1$. Signals on the backward transmission path DBt of the called trunk Dt can be transmitted to the register Rs via the fourth common signal circuit BH4 provided that backward hold is applied to the backward transmission path DBt of the called trunk Dt.

The second inputs of the pulse suppression gate circuits KF and KB are shown connected respectivey to the terminals JF and JB. In the particular method of carrying out the invention which is here described, the terminal JB is permanently connected to the terminal J1 and the terminal JF is permanently connected to the terminal J2. This has the effect of connecting the second input of the pulse suppression gate circuit KF to the third common signal circuit FH3 on the input side of the pulse shaping gate circuit G3, and of connecting the second input of the pulse suppression gate circuit KB to the second common signal circuit BH2 on the input side of the pulse shaping gate circuit G2.

Transmission of signals from the forward transmission path AFr of the calling trunk Ar via the pulse suppression gate circuit KF to the forward transmission path DFt of the called trunk Dt is prevented as long as forward hold is maintained on the register outgoing trunk CFs since this hold signal causes the pulse train pr to appear on the common signal circuit FH3 and hence at the second input of the pulse suppression gate circuit KF. Any pulses applied in this way to the second input of the pulse suppression gate circuit KF will overlap in time any synchronous pulses applied to the first input because the former pulses are taken from the common signal circuit FH3 before passing through the pulse shaping gate circuit G3 while the latter pulses are taken from the common signal circuit FH1 after passing through the pulse shaping gate circuit G1 and being reduced in duration as already described. The pulse train pr which appears on the common signal circuit FH1 modulated with any signals on the forward transmission path AFr of the calling trunk Ar is thus prevented from passing through the pulse suppression gate circuit KF. In a similar manner, transmission of signals from the backward transmission path DBt of the called trunk Dt via the pulse suppression gate circuit KB to the backward transmission path ABr of the calling trunk Ar is prevented as long as backward hold is maintained on the register ingoing trunk Bs.

When the register Rs has finished receiving and transmitting information necessary for the completion of the through connection of which the connection between the calling trunk Ar and the called trunk Dt forms a part and the register is ready to disconnect itself from the connection between the calling trunk Ar and the called trunk Dt, the register Rs removes forward hold from the register outgoing trunk Cs and removes backward hold from the register ingoing trunk Bs. The removal of forward hold from the register outgoing trunk Cs results in the disappearance of the pulse train $pr^1$ from the second common signal circuit BH2 and from the second input of the pulse suppression gate circuit KB, thus permitting the pulse train pr on the first common signal circuit FH1 to pass through the pulse suppression gate circuit KF and appear on the common signal circuit $FH3^1$. As the pulse trains pr and $pr^{11}$ are synchronous, signals can be transmitted forward from the calling trunk Ar to the called trunk Dt. In a similar manner the removal of backward hold from the register ingoing trunk Bs permits signals to be transmitted backward from the called trunk Dt to the calling trunk Ar. The selector Ss will continue to generate the pulse train $pr^1$ until both forward hold on the register outgoing trunk Cs and backward hold on the register ingoing trunk Bs have been removed when it will cease to generate the pulse train $pr^1$. The register Rs may therefore complete the connection between the calling trunk Ar and the called trunk Dt in one direction by removing the appropriate hold without breaking down the connection between the register Rs and the calling and called trunks Ar and Dt. Only when the register Rs has removed both forward and backward holds does the selector Ss cease to generate the pulse train $pr^1$, thus dissociating the register Rs from the connection between the calling trunk Ar and the called trunk Dt. As long as forward hold is maintained on calling circuit AFr after the register has released, the slave selector Tt will continue to generate the pulse $pr''$ and feed it to modulator DPt and demodulator DQt to maintain the connection.

In order to cater for a forced release operation a third input of suppressing pulses may be added to gate circuit KF, and that input may be connected to terminal JF. The third input may be taken from any suitable source of suppressing pulses synchronous with those to be suppressed, e. g., it may be taken from terminal J1 if suitable provision is made for decoupling to prevent transmission of pulses from terminal J1 to terminal J2 and vice versa, as by use of known one-way transmission devices as referred to in connection with the decoupling circuit L. Then when the register wishes to disconnect itself from the called circuit and at the same time to cause any apparatus associated with the called circuit to drop out of circuit, the hold signal from the register may be disconnected from circuit CFs and after an interval the hold signal may be disconnected from circuit BBs. The first operation removes the hold signal from the called circuits forward transmission path DFt and gate circuit KF still suppresses the hold signals from the calling circuit because of the presence of the inhibiting pulses on the third input to that gate circuit. The second operation disconnects the register from the calling circuit on the disappearance of the hold signal on circuits BBs and BLs, the hold signal on circuit CLs having disappeared on the first operation and the pulses of the calling circuit then appear once more as calling pulses on highway FH1 until the calling trunk circuit "clears."

In the example of a transmission system embodying the invention which has been described with reference to Fig. 1 of the drawing, the pulse suppression gate circuits KF and KB are not controlled independently in that any suppressing impulse applied to one of them is also applied to the other. In an alternative example of a transmission system embodying the invention, the pulse suppression gate circuits KF and KB are controlled independently so that the register can by emitting suitable controlling signals, cause suppressing impulses to be applied to one of the gate circuits but not to the other. By this means the register can permit direct communication through the switch between a calling trunk and a called trunk in one direction of transmission while preventing such direct communication in the opposite direction of transmission.

It will be appreciated that other modifications in carrying out the invention may be adopted and for example the pulse suppression gates associated with the transmission forward and backward directions through the switch may be supplied with suppressing pulses from different sources so that the operations of the gates can be controlled independently.

Again although in the particular example described, the calling and called trunks are temporarily connected to a register, the invention may be used when such trunks are to be temporarily connected to some other form of equipment such as a metering unit.

The pulse modulators and pulse demodulators used in carrying out the invention may be of the form described in the specification of co-pending patent application S. No. 56,619 filed October 26, 1948, S. No. 191,584 filed October 23, 1950, or S. No. 212,736 filed February 26, 1951. The means for applying a marking signal to a selector may be of the form described in the specification of co-pending patent application S. No. 177,411 filed August 3, 1950. While the present invention resides in the general organization, rather than in the specific means employed in its several elements, Fig. 2 is presented to illustrate the practice of the invention with known pulse modulators, demodulators and suppressors, shown as of the type described in the said copending application Ser. No. 56,619, filed October 26, 1948, interconnected as described above. In this figure the illustrative forms of components employable in pulse modulator AP*r* and demodulator AQ*r* correspond to those of Fig. 3*a* of application Ser. No. 56,619 and are designated by the same reference numerals. The suppressor grids of the pentode tubes 1 and 11 are connected with condenser C6 and through resistor R6 to pulse source $P_1$ as in Fig. 3*a* of the copending application. The generator of the pulses $P_1$ is shown as of the type described in application Ser. No. 56,619, and also in copending applications Ser. Nos. 212,736 and 224,874. The gate $G_1$ employs a pentode 31*a* that comprises an inverter corresponding to inverter 31 of application Ser. No. 56,619 and, as described above, includes a gating grid connected to the synchronous gating pulse source $K_1$ in the manner described herein and in application Ser. No. 56,619. This gate, functioning in the same manner as the gate in valve 1 of block AP*r*, serves to shape the pulses as above described. The valve 32 in block KF corresponds with valve 32 in application Ser. No. 56,619 and thus is a cathode follower operating as a suppression gate and supplied with pulses, herein from JF, through a like polarity reversing transformer. Elements C7, C8 and 33 correspond to like elements in Fig. 3*a* of application Ser. No. 56,619. The other items in Fig. 1, namely, items BP*s*, BQ*s*; CP*s*, CQ*s*; DP*t*, DQ*t*; $G_2$, $G_3$, $G_4$ and KB, may have structures similar to those of items AP*r*, AB*r*, $G_1$ and KF, shown, and hence need no further illustration.

I claim:

1. A communication switching system comprising a calling trunk, a called trunk, a register, and time division multiplex switching means for establishing communication from the calling trunk to the register and from the register to the called trunk; said switching means comprising a first means for establishing communication between the calling trunk and the register on a selected time division channel pulse train, a second means for establishing communication between the register and the called trunk on a time division channel pulse train having pulses coincident with those of said selected train, and a third means connecting said first and second means and comprising pulse suppression gate means, said system further comprising means for supplying to said gate means a suppressing time division channel pulse train coincident with said selected train and connected to block communication through said third means on said selected train, removal of the suppressing train establishing communication between the calling and called trunks via said third means on said selected time division pulse train.

2. A communication switching system comprising a calling trunk, a called trunk, a third trunk connected to equipment to which the calling trunk is to be temporarily connected, a fourth trunk connected to said equipment for connection to the called trunk, and time division multiplex switching means associated with said several trunks; said switching means comprising a first common trunk for establishing communication between the calling trunk and the third trunk on a selected time division channel pulse train, a second common trunk for establishing communication between said fourth trunk and said called trunk on a time division channel pulse train having pulses coincident with those of said selected train, and a third common trunk connecting said first and second common trunks and comprising pulse suppression gate means; said system further comprising means for supplying to said gate means a transmission suppressing time division channel pulse train coincident with said selected train and connected to block communication through said third common trunk on said selected train while the pulse suppressing operation is maintained.

3. A communication switching system according to claim 2, each of said trunks comprising forward and backward transmission paths or circuits, said time division multiplex switching means having pulse modulators with demodulators paired therewith through which the connections are made from said common trunks to the circuits of the calling, called, and third and fourth trunks, said modulator and demodulator sets being connected so that communication signals are not pulse modulated in said calling, called and third and fourth trunks but are pulse modulated in said common trunks.

4. A communication switching system according to claim 3 in which a common selector pulse generator is connected to supply the pulse train coincident with the selected train to the paired modulators and demodulators through which connections are made between said common trunk and said third and fourth trunks, thus insuring that the pulse trains in the second common trunk comprise pulses coincident with the pulse trains in the first common trunk.

5. A communication switching system according to claim 4 in which the means for supplying the transmission suppressing pulse train to the pulse suppressing gate means derives said train from the common selector pulse generator.

6. A communication switching system according to claim 5, in which the presence of the pulse train on at least one of the circuits of the first and second common trunks is dependent on the operation of the aforesaid equipment connected between said trunks, and in which said suppression train supplying means derives said suppression train from said dependent pulse train, so that removal of the suppression train is controlled by the operation of said equipment.

7. A communication switching system according to claim 3 in which pulse suppressing gate means are included in each of the forward and backward transmission paths of said third common trunk and separately supplied with suppressing pulses, whereby the operation of the gate means may be separately controlled.

8. A communication switching system comprising a calling trunk, a called trunk, a time division multiplex switch, and a register through which the calling trunk by way of said switch may be connected to the called trunk; said switch comprising a first common trunk, a second common trunk, and a third common trunk interconnecting the first and second common trunks and including pulse suppression gate means; said register comprising an ingoing trunk and an outgoing trunk; each of said trunks comprising forward transmission and backward transmission paths, said switching means comprising time division modulating switch input means and time division demodulating switch output means for connecting the forward and backward paths of the first common trunk to those of the calling and ingoing trunks, and for connecting the forward and backward paths of the second common trunk to those of the outgoing and called trunks; all said modulating and demodulating means in the switch operating synchronously; and said switch further comprising means for applying, to said suppression gate means, transmission suppressing pulses synchronous with the pulses produced by said modulating means for preventing direct two-way communication between the calling and called trunks until such communication is required.

9. A communication switching system according to claim 8, having combined therewith a time division pulse selector generator and means responsive to the appearance of a calling pulse train on the forward circuit of the first common trunk for initiating generation by said selector generator of a pulse train synchronous with said calling pulse train and for applying the so generated pulse train to gate the modulators and demodulators connecting the circuits of said common trunks with the circuits of said ingoing and outgoing trunks, respectively.

10. A communication switching system according to claim 9, in which said selector generator after an initial period of operation, continues to operate only when marked, and in which means is provided for marking said selector generator responsive to a marking applied by said register to a register output circuit.

11. A communication switching system according to claim 10, in which said means for marking said selector generator is responsive to a backward marking applied by said register to the backward circuit of said ingoing trunk.

12. A communication switching system according to claim 10, in which said means for marking said selector generator is responsive to a forward marking applied by said register to the forward circuit of said outgoing trunk.

13. A communication switching system according to claim 10, in which said means for marking said selector generator is responsive to a forward marking applied by said register to the forward circuit of the outgoing trunk and also to a backward marking applied by said register to the backward circuit of said ingoing trunk.

14. A communication switching system according to claim 9, further comprising a second time division pulse selector generator and means responsive to the appearance of a channel pulse train on the forward circuit of the second common trunk for initiating generation by said second selector generator of a channel pulse train synchronous with the channel pulse train on the forward circuit of said second common trunk and for applying the so generated pulse train to gate the modulator and demodulator connecting the second common trunk circuits to the called trunk circuits, respectively.

15. A communication switching system according to claim 14 in which operation of said second selector generator is initiated in response to marking applied by said register to a register output circuit.

16. In a time division multiplex communication system in combination, a plurality of calling trunks, a plurality of called trunks, and a plurality of registers each having a register ingoing trunk and a register outgoing trunk; time division multiplex switching means comprising a first common trunk, and a second common trunk, and a common by-pass trunk interconnecting said first and second common trunks; each of said trunks comprising forward and backward speech and signal circuits; said switching means comprising time division pulse modulators in the inputs to said common trunk circuits from said calling-, called- and register trunk circuits, and time division pulse demodulators in the outputs from said common trunk circuits to the calling-, called- and register trunk circuits; the modulator associated with a calling trunk being operative in response to a signal from said calling trunk to modulate said signal on a first time division pulse channel and apply the so modulated signal to the forward circuit of the first common trunk, means responsive to such modulated signal for operating the modulators and demodulators between said common trunks and one of said registers on the same time division pulse channel, means operable in response to the so modulated output of the register on the second common trunk for operating the modulator and demodulator between the second common trunk and the called trunk on the same time division channel, pulse gating means in a circuit of said common by-pass trunk, and means for supplying a train of suppressing pulses on the same time division channel and for applying the same to suppress pulse transmission on said time division channel through said gating means until such communication is required.

17. A combination according to claim 16, in which pulse gating means is provided in each of the circuits of said common by-pass trunk, and in which the train of suppressing pulses is applied to each of said gating means.

18. A combination according to claim 16, in which pulse gating means is provided in each of the circuits of said common by-pass trunk, and in which separate but synchronous trains of suppressing pulses separately controlled are applied to said respective gating means.

References Cited in the file of this patent

UNITED STATES PATENTS

| Number | Name | Date |
|---|---|---|
| 2,513,291 | Deloraine et al. | July 4, 1950 |